United States Patent
Krok et al.

(10) Patent No.: US 8,392,031 B2
(45) Date of Patent: Mar. 5, 2013

(54) SYSTEM AND METHOD FOR LOAD FORECASTING

(75) Inventors: Michael Joseph Krok, Clifton Park, NY (US); Yan Pan, Niskayuna, NY (US); Wei Ren, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 19 days.

(21) Appl. No.: 13/036,828

(22) Filed: Feb. 28, 2011

(65) Prior Publication Data

US 2012/0221158 A1  Aug. 30, 2012

(51) Int. Cl.
*G05D 3/12* (2006.01)
*G05D 5/00* (2006.01)
*G05D 9/00* (2006.01)
*G05D 11/00* (2006.01)
*G05D 17/00* (2006.01)
*G06Q 10/00* (2012.01)
*G06Q 30/00* (2012.01)

(52) U.S. Cl. ....... 700/291; 700/286; 700/295; 705/7.29; 705/7.31

(58) Field of Classification Search .................. 700/286, 700/291, 295, 297; 705/7.29, 7.31
See application file for complete search history.

(56) References Cited

U.S. PATENT DOCUMENTS

| | | | |
|---|---|---|---|
| 7,519,506 B2 | 4/2009 | Trias | |
| 7,725,374 B2 * | 5/2010 | Van Erlach et al. | 705/35 |
| 7,979,239 B2 * | 7/2011 | Trias | 702/182 |
| 8,121,741 B2 * | 2/2012 | Taft et al. | 700/295 |
| 2003/0208523 A1 * | 11/2003 | Gopalan et al. | 709/201 |
| 2004/0143396 A1 * | 7/2004 | Allen et al. | 702/3 |
| 2008/0046387 A1 * | 2/2008 | Gopal et al. | 705/412 |
| 2008/0224892 A1 * | 9/2008 | Bogolea et al. | 340/870.3 |
| 2009/0113049 A1 * | 4/2009 | Nasle et al. | 709/224 |
| 2009/0228154 A1 * | 9/2009 | Trias | 700/295 |
| 2010/0179704 A1 * | 7/2010 | Ozog | 700/291 |

OTHER PUBLICATIONS

H.K. Alfares et al., "Electric load forecasting: literature survey and classification of methods," International Journal of Systems Science, vol. 33, No. 1, 2002, pp. 23-34.
K. Metaxiotis et al., "Artificial intelligence in short term electric load forecasting: a state-of-the-art survey for the researcher," Pergamon, Energy Conversion & Management, vol. 44, 2003, pp. 1525-1534.

* cited by examiner

*Primary Examiner* — Ramesh Patel
(74) *Attorney, Agent, or Firm* — Ann M. Agosti

(57) ABSTRACT

A method of load forecasting for a present day includes obtaining past observed load values of at least three earlier days and identifying a relationship between the present day's load forecast and the past observed load values including unknown weights associated with the past observed load values. The values of unknown weights are determined by comparing at least one previous day's load forecast with the observed load value of the at least one previous day. The determined weight values are then used in the relationship between the present day's load forecast and the past observed load values to forecast the present day's load.

20 Claims, 5 Drawing Sheets

SYSTEM AND METHOD FOR LOAD FORECASTING

BACKGROUND

The invention relates generally to an electric power grid and more specifically to load forecasting in the power grid.

A smart grid delivers electricity to consumers while leveraging digital communication technology to reduce cost, save energy, and increase reliability. If designed properly, the smart grid will have a significant impact on improving a wide range of aspects in the electric power generation and distribution industry. Examples include self-healing, high-reliability, resistance to cyber attack, accommodation of a wide variety of types of distributed generation and storage mechanisms, optimized asset allocation, and minimization of operation and maintenance expenses as well as high-resolution market control that incorporates advanced metering and demand-response.

Energy Management System (EMS) and Distribution Management System (DMS) are important components of the smart grid. EMS and DMS are utilized for providing capabilities to operate the bulk power system in a safe, reliable, and economic manner and further for developing new functions and capabilities for improving the reliability and efficiency of the distribution system. DMS uses load forecasting methodologies for distribution systems providing power to homes, commercial businesses, and industrial businesses. One of the methods of load forecasting is "similar day load forecasting". In the similar day load forecasting approach, an operator is allowed to build and modify forecasts. Load forecasting approaches of this type which need human intervention can be time consuming. Further, human intervention is difficult to quantify and requires a certain amount of expertise.

Therefore, there is a need for an improved load forecasting method to address one or more aforementioned issues.

BRIEF DESCRIPTION

In accordance with an embodiment of the present invention, a method of load forecasting for a present day is provided. The method includes obtaining past observed load values of at least three earlier days and determining a relationship between the present day's load forecast and the past observed load values including unknown weights associated with the past observed load values. The method further includes determining weight values of the unknown weights by comparing at least one previous day's load forecast with the observed load value of the at least one previous day. The values of unknown weights are then used in the relationship between the present day's load forecast and the past observed load values to forecast the present day's load.

In accordance with another embodiment of the present invention, a load forecasting module for a power grid is provided. The load forecasting module includes a database of past observed load values of at least three earlier days and an equation identification module to identify a relationship between a present day's load forecast and the past observed load values including unknown weights associated with the past observed load values. The load forecasting module further includes a weight value identification module to determine weight values of the unknown weights by comparing at least one previous day's load forecast with the observed load value of the at least one previous day.

In accordance with yet another embodiment of the present invention, a computer-readable medium including non-transitory computer-readable instructions of a computer program that, when executed by a processor, cause the processor to perform a method of load forecasting is presented. The method includes obtaining past observed load values of at least three earlier days and determining a relationship between the present day's load forecast and the past observed load values including unknown weights associated with the past observed load values. The method further includes determining weight values of the unknown weights by comparing at least one previous day's load forecast with the observed load value of the at least one previous day. The values of unknown weights are then used in the relationship between the present day's load forecast and the past observed load values to forecast the present day's load.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
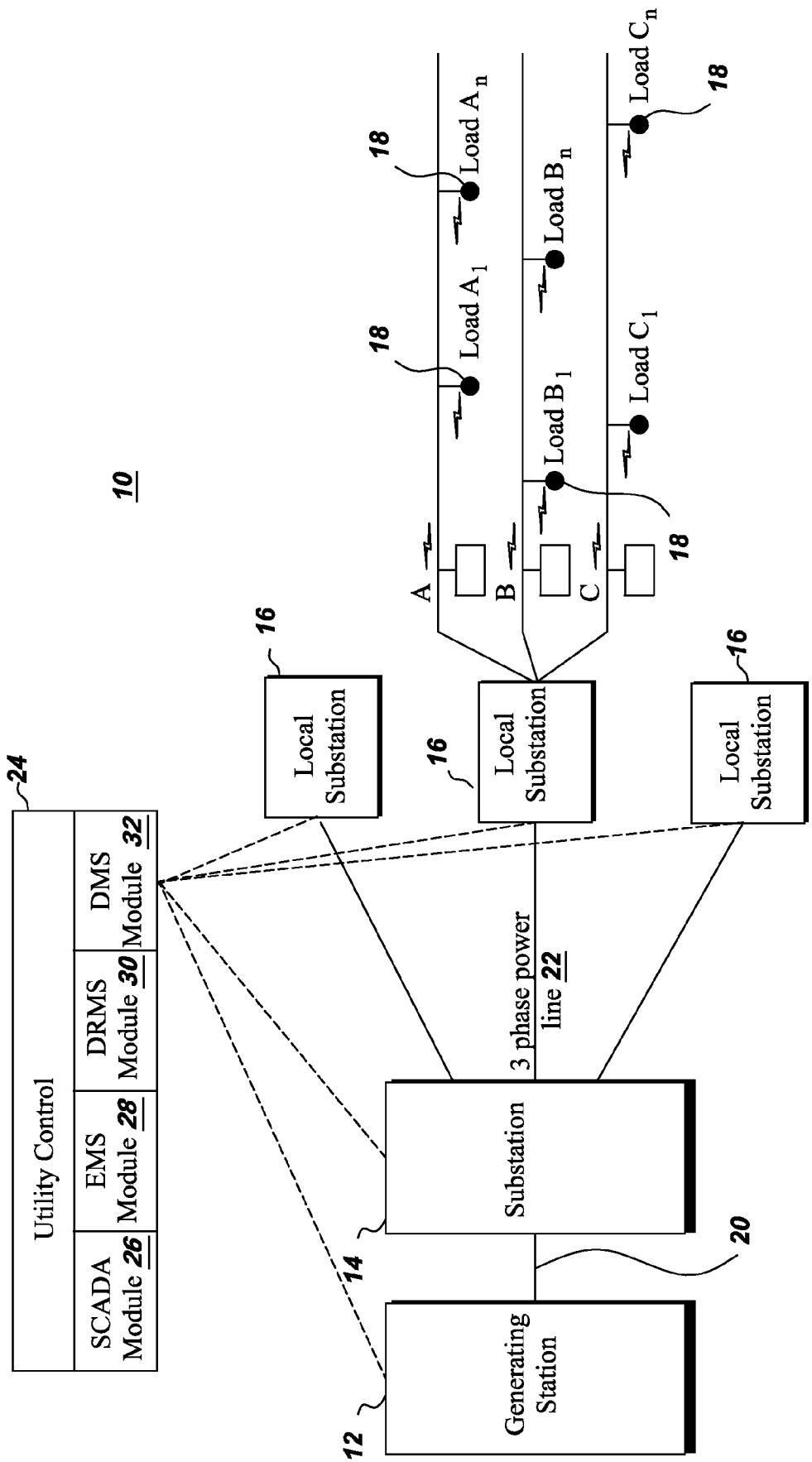
FIG. 1 is a diagrammatical representation of an overall electric system.

FIG. 1 illustrates a single line diagram of an overall electric system 10 from generation to utilization. The electric system 10 includes a generating station 12, a transmission substation 14, local substations or distribution substations 16 and loads 18. Generating station 12 may comprise a hydropower generating station, a thermal power generating station, a wind power generating station, or a solar power generating station, for example. Generating station 12 generates electricity at a generating station voltage which is in the range of 4 kV to 13 kV. The generating station voltage is stepped up to a higher transmission level voltage such as 110 kV and above by a generating station transformer (not shown) for more efficient transfer of the electricity.

The electricity at the transmission level voltage is transmitted to transmission substation 14 by primary transmission lines 20 that are configured to carry electricity long distances. At transmission substation 14, a reduction in voltage occurs for distribution to other points in the system through secondary transmission lines 22. Further voltage reductions for commercial and industrial or residential loads 18 may occur at distribution substation 16. The distribution substation 16 may supply electricity at voltages in the range of 4 kV to 69 kV, for example. The voltages may further by reduced by one or two more levels at distribution substation 16 or other local substations (not shown) receiving power from distribution substation 16 to supply the electricity to residential loads at lower voltages such as 120 V or 240 V.

A utility control center 24 is used in the system 10 for operation and maintenance of generating station 12, transmission substation 14, and distribution substations 16. Utility control center 24 receives data from these components and also provides control signals to these components. Loads 18 may communicate with their respective distribution substations 16 and thus, the utility control center 24 may also receive and transmit information to and from the loads 18. Components of the utility control center 24 include a supervisory control and data acquisition (SCADA) system 26, an energy management system (EMS) 28, a demand response management system (DRMS) 30, and a distribution management system (DMS) 32. In one embodiment, some of these components may be provided separately in system 10 rather than being integrated in the utility control center 24.

As will be appreciated by those skilled in the art, SCADA usually refers to basic control and monitoring of field devices including breakers, switches, capacitors, reclosers, and transformers. EMS 28 coordinates and optimizes power generation and transmission, whereas DMS 32 coordinates power distribution. EMS 28 and DMS 32 include applications such as automatic generation control (AGC), load forecasting, engineering load flow, economic dispatch, energy accounting, interchange transactions, reserve calculations (spin and non-spin), and VAR/voltage control. DRMS 30 controls peak demand and produces other economies without major inconvenience to the customer. In some embodiments, DRMS 30 is added as a function of the EMS 28 because of its use in controlling overall peak demand and generation requirements. Further DMS 32 includes functions and capabilities that would improve the reliability and efficiency of the power distribution system.

Figure 2:
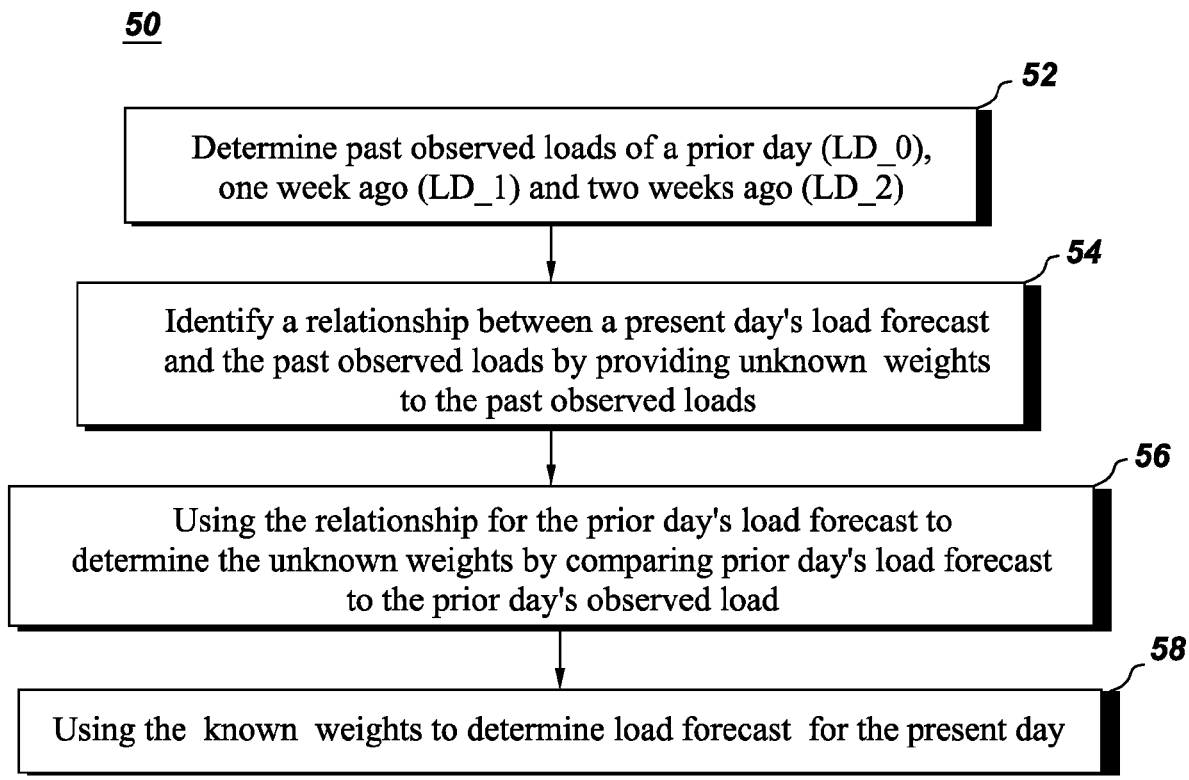
FIG. 2 is a flow chart representing a method of load forecasting in accordance with an embodiment of the present invention.

FIG. 2 illustrates a method 50 of load forecasting for a power grid that may be used in EMS or DMS in accordance with an embodiment of the present invention. In step 52, method 50 includes determining past observed loads such as an observed load of previous day (LD_0), an observed load of the same day last week (LD_1), and an observed load of the same day two weeks ago (LD_2). It should be noted that the loads LD_0, LD_1, and LD_2 are not constants and instead are sets of load values which vary over 24 hours of the day. Thus, LD_0, LD_1 and LD_2 may be represented as a matrix or a curve. The time steps at which the load values are observed may be determined by an operator of the load forecasting system. In one embodiment, the time step may be 1 hour. In another embodiment it may be 10 minutes. In step 54, a relationship is identified between the observed loads (LD_0, LD_1 and LD_2) and the present day's load forecast (LD_f). The relationship may include providing unknown weights for each of the observed loads. In one embodiment, the load forecast LD_f of present day may be given by summation of all weighted observed loads:

$$LD\_f = a*LD\_0 + b*LD\_1 + c*LD\_2 \quad (1)$$

where a, b, and c are unknown weights and a*LD_0, b*LD_1, and c*LD_2 are weighted observed loads. In step 56, the previous day's load forecast equation LD_f is compared with the actual or observed load LD_0 of the previous day to identify the unknown weights a, b, and c.

For purposes of example, Table 1 provides observed or actual load values for certain days in a month of May in terms of MVA values with a time step of around 5 hours.

TABLE 1

| Observed loads in the month of May | | | | | |
|---|---|---|---|---|---|
| $2^{nd}$ May | $3^{rd}$ May | $9^{th}$ May | $10^{th}$ May | $15^{th}$ May | $16^{th}$ May |
| 370 | 325 | 175 | 250 | 400 | 300 |
| 200 | 150 | 350 | 320 | 380 | 375 |
| 180 | 250 | 300 | 350 | 250 | 350 |
| 430 | 275 | 320 | 420 | 310 | 400 |
| 375 | 440 | 275 | 350 | 190 | 290 |

Based on the observed load values in Table 1, the equation for predicted load of 16th May (LD_16') may be compared with observed load LD_16 of $16^{th}$ May (column 6, Table 1). For example, $$LD\_16 = a*LD\_15 + b*LD\_9 + c*LD\_2 \quad (2)$$

Where LD_15, LD_9 and LD_2 are the observed loads on $15^{th}$ May (column 5, Table 1), $9^{th}$ May (column 3, Table 1), and $2^{nd}$ May (column 1, Table 1) respectively. Equation (2) is then solved to determine unknown weights a, b, and c. In one embodiment, a curve fitting algorithm may be used to solve equation (2). The curve fitting algorithm may include a least square algorithm or a maximum likelihood estimation algorithm. As will be appreciated by those skilled in the art, the least square algorithm is a standard approach to the approximate solution of overdetermined systems, i.e. sets of equations in which there are more equations than unknowns as in the present case. Based on this approach, one solution for equation (2) may be a=0.295, b=0.741, and c=0.133. Once the values of unknown weights are determined, the known weight values are utilized to forecast the load for the present day in step 58. Thus, the equation for the load forecast of $17^{th}$ May will be as follows:

$$LD\_17 = 0.295*LD\_16 + 0.741*LD\_10 + 0.133*LD\_3 \quad (3)$$

The values of LD_16, LD_10 and LD_3 can be obtained from table 1 for forecasting load LD_17. Data of the type shown in table 1 may typically be obtained from conventional SCADA systems, for example.

Figure 3:
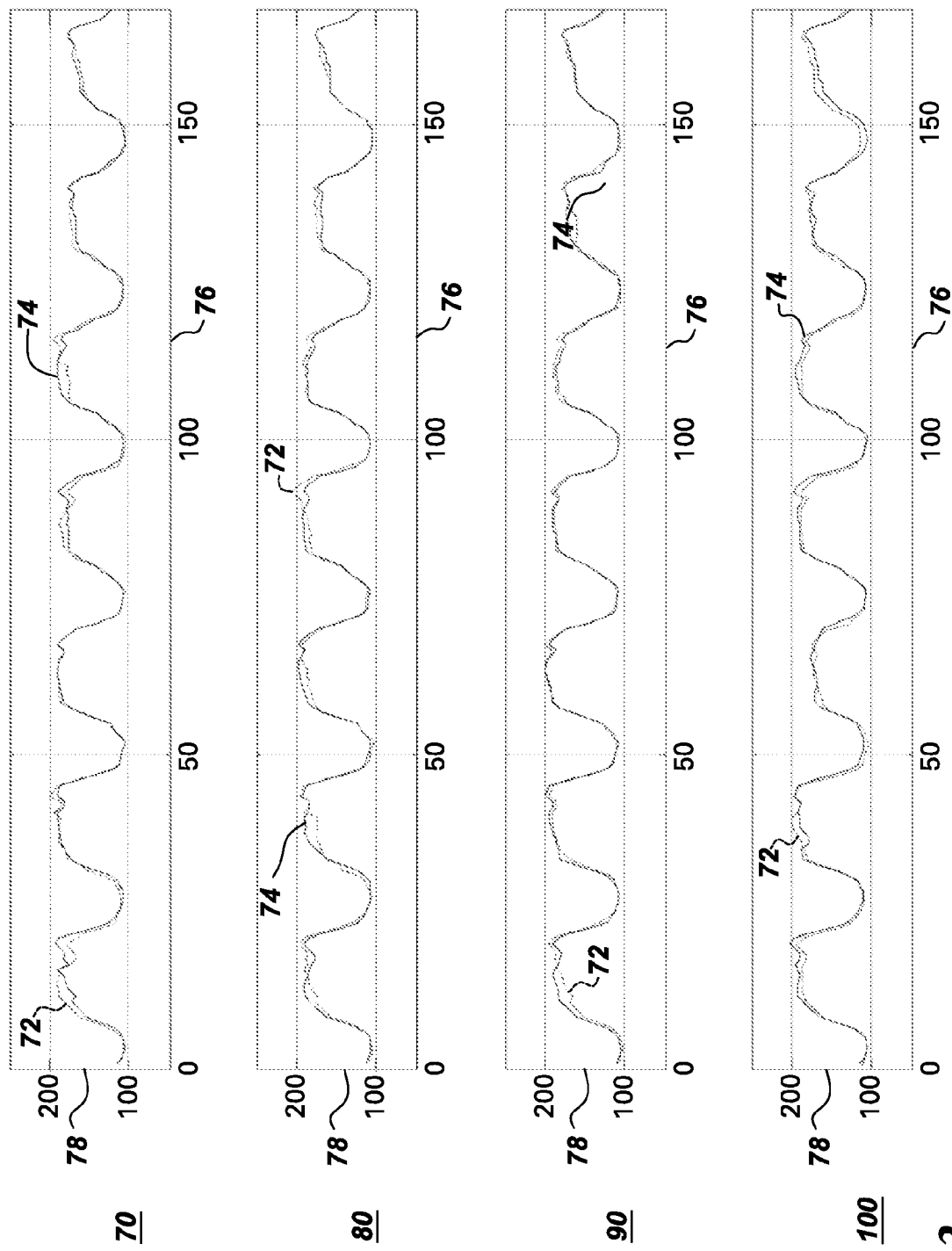
FIG. 3 is a graphical representation of a comparison of observed load versus forecasted load.

FIG. 3 shows comparison plots 70, 80, 90 and 100 of a forecasted load 72 and an observed load 74 for a period of a month. Horizontal axis 76 in all plots represents time in hours and vertical axis 78 represents load in MVA. Plot 70 is for a period from $11^{th}$ to $17^{th}$ June, plot 80 is for $18^{th}$ to $24^{th}$ June, plot 90 is for $25^{th}$ June to $1^{st}$ July and plot 100 is for $2^{nd}$ July to $8^{th}$ July. From the plots it can be seen that the forecasted load curve follows the observed load curve closely. It can also be observed that the load curves follow a day (high load) and a night (low load) schedule. Further, during $4^{th}$ of July there is a dip 78 in plot 100 compared to the other plots because of a holiday.

In one embodiment of the present invention, if any of the past data falls on a weekend or a holiday then that data may be replaced with a nearby weekday or a working day. For example, while forecasting load of $17^{th}$ May (a weekday), the data that is used is of $16^{th}$ May, $10^{th}$ May and $3^{rd}$ May. However, if any of these days falls on a weekend then the nearest weekday may be used like $15^{th}$ May instead of $16^{th}$ May and so on.

In another embodiment, the load may be forecasted multiple times in 24 hours if there is a need. For example, if it is observed that the error between the forecasted load and the observed load for the previous hour of the day was 100 MVA, then an offset of 100 MVA may be added to the load forecasting equation to modify or adjust the prediction. One more prediction for load may be scheduled after some time if the error between the observed load and the forecasted load shoots up again and exceeds a threshold value. The above approach may be summarized by following equation:

$$LD\_f = a*LD\_0 + b*LD\_1 + c*LD\_2(3) + E \quad (4)$$

where E is the error between the forecasted load and the observed load. In another embodiment, both single prediction and multiple time prediction may be used simultaneously.

The use of multiple forecasting iterations on a single day is particularly helpful when the present day falls on a holiday. For example, if the load is to be forecasted for a holiday such as Memorial Day, then in one embodiment, for load forecasting at 8 am, a prediction error for 12 am to 8 am may be calculated and used to modify the prediction values for next 16 hours the same day. In addition, there will be some days in which the load is completely different from its immediate past. In statistical terms, these are outliers. Therefore, the load will be significantly different at multiple times during the day. Once the computational requirements are satisfied for a single load forecast, then they will be satisfied for multiple forecasts. In these situations, it will be easier from a scheduling viewpoint to periodically update the load forecast at a consistent time interval.

Figure 4:
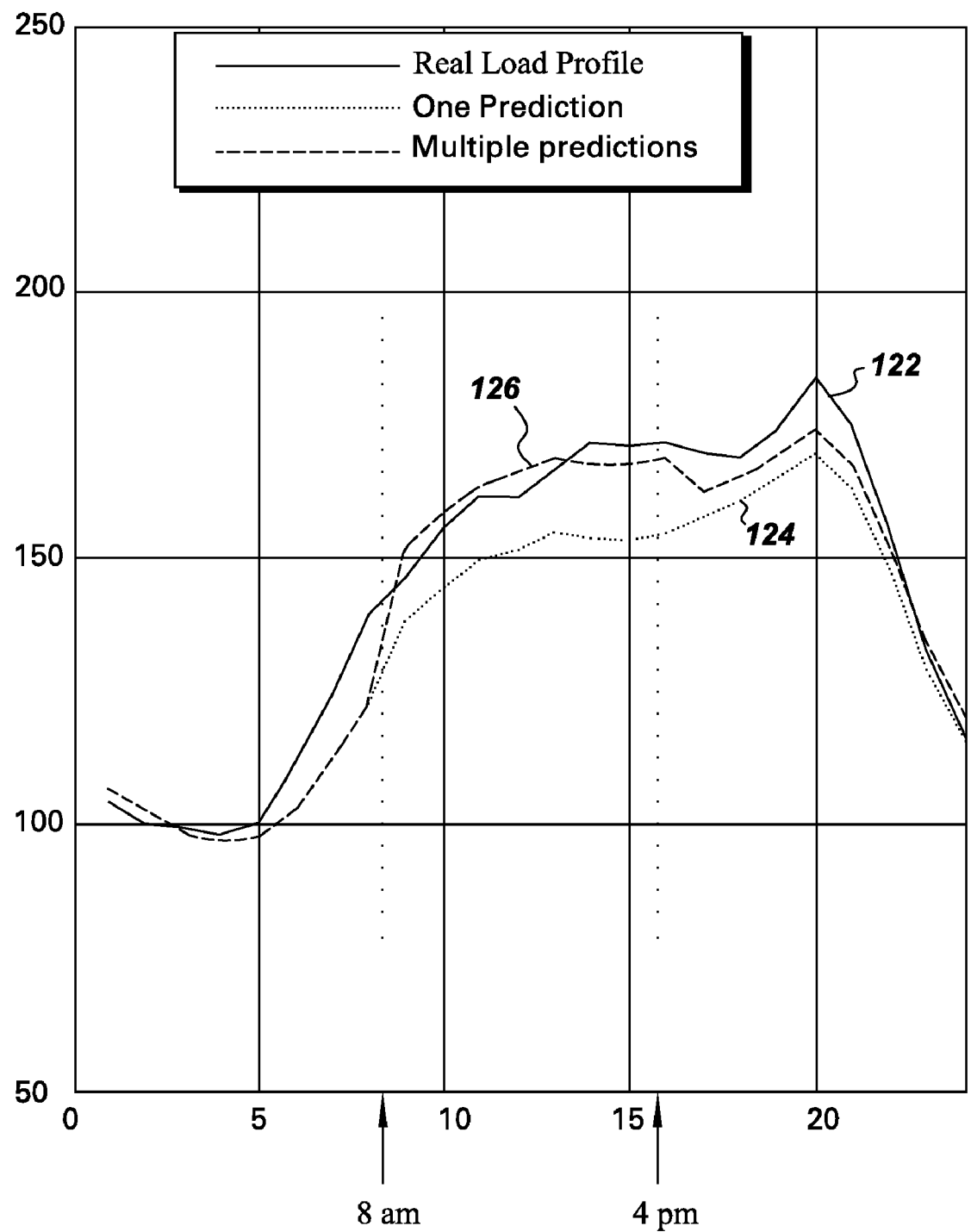
FIG. 4 is a graphical representation of a comparison of single time load prediction and multiple time load prediction.

FIG. 4 shows a comparison plot 120 of single time prediction versus multiple time prediction. In plot 120, curve 122 is an actual load profile, curve 124 is a single prediction load profile and curve 126 is a multiple time prediction load profile. It can be seen from plot 120 that up to 8 am the multiple time prediction and the single prediction load curves are overlapped. This is because load forecasting equation has not been changed till that time as the error between single prediction load profile and actual load profile is not significant. However, at or around 8 am the error exceeds a threshold value and hence the load forecasting equation is updated to adjust for the error. Thus, the updated or multiple prediction load profile is able to follow the actual load profile more closely.

Figure 5:
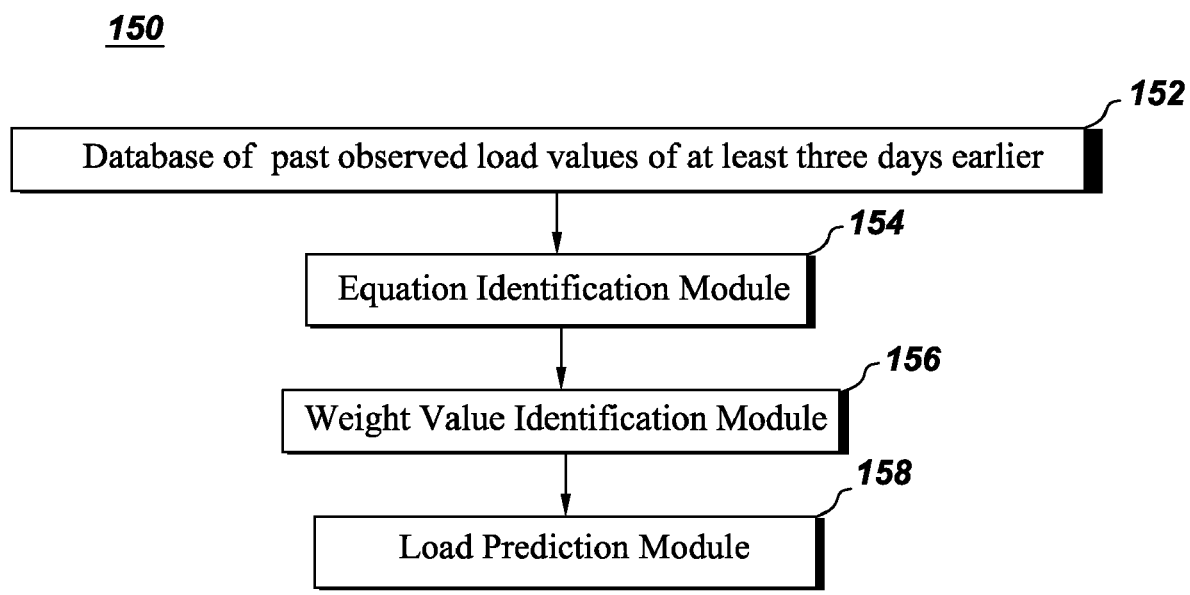
FIG. 5 is a block diagram representing a load forecasting module in accordance with an embodiment of the present invention.

FIG. 5 shows a load forecasting module 150 in accordance with an embodiment of the present invention. Module 150 includes a database 152 of past observed load values such as an observed load of the previous day, an observed load of the same day last week, and an observed load of the same day two weeks ago. The data in database 152 may be obtained from the conventional SCADA system. Module 150 further includes an equation identification module 154 to identify a relationship between a present day's load forecast and the past observed load values. The relationship may include unknown weights for each of the past observed loads. A weight value identification module 156 then determines weight values of unknown weights by comparing the previous day's load forecast equation with the actual load of the previous day. Based on the identified weight values from module 156 and the relationship obtained from module 154, a load prediction module 158 forecasts the load for the present day.

One of the advantages of the described technique is that it is automatic and does not require human intervention. Further, embodiments of the present invention may reduce load forecasting error and accounts for holidays and weekends.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of load forecasting for a present day comprising:
    obtaining past observed load values of at least three earlier days;
    identifying a relationship between the present day's load forecast and the past observed load values including unknown weights associated with the past observed load values;
    determining weight values of the unknown weights by comparing at least one previous day's load forecast with the past observed load values of the at least one previous day; and
    using the determined weight values in the relationship between the present day's load forecast and the past observed load values to forecast the present day's load.

2. The method of claim 1, wherein the at least three earlier days comprise the immediately preceding day, a day one week prior, and a day two weeks prior.

3. The method of claim 1, wherein the at least three earlier days comprise the immediately preceding day unless the immediately preceding day is a different category, a day one week prior, and a day two weeks prior, wherein the categories comprise weekday days, weekend days, and holidays.

4. The method of claim 1, wherein the at least three earlier days include the at least one previous day.

5. The method of claim 1, wherein the past observed load values comprise multiple sets of data values measured with a time step over a period of a day.

6. The method of claim 5, wherein the time step comprises a user defined time.

7. The method of claim 1, wherein the relationship comprises a summation of all weighted past observed loads.

8. The method of claim 7, wherein the weighted past observed loads are determined by multiplying the past observed loads with the respective unknown weights.

9. The method of claim 1, wherein determining weight values of the unknown weights comprises determining a solution for the relationship between the present day's load forecast and the past observed load values.

10. The method of claim 9, wherein determining the solution comprises utilizing a curve fitting algorithm.

11. The method of claim 10, wherein the curve fitting algorithm comprises a least square algorithm.

12. The method of claim 10, wherein the curve fitting algorithm comprises a maximum likelihood estimation algorithm.

13. The method of claim 1, wherein when the present day is a working day and when any of the past observed load data is of a holiday utilizing a load data of a working day nearby the holiday.

14. The method of claim 1, wherein, when an error between the forecasted load of the present day and an actual load of the present day exceeds a threshold value, forecasting the load for the present day multiple times.

15. The method of claim 14, wherein forecasting the load of the present day multiple times comprises adjusting the load forecast of the present day by compensating for the error.

16. A load forecasting module for a power grid, the load forecasting module comprising:
    a database of past observed load values of at least three earlier days;
    an equation identification module for identifying a relationship between a present day's load forecast and the past observed load values including unknown weights associated with the past observed load values;

a weight value identification module for determining weight values of the unknown weights by comparing at least one previous day's load forecast with the past observed load values of the at least one previous day; and a load prediction module for forecasting the present day's load by using the determined weight values in the relationship between the present day's load forecast.

17. The system of claim 16, wherein the at least three earlier days comprise the immediately preceding day, a day one week prior, and a day two weeks prior.

18. The system of claim 16, wherein the at least three earlier days comprise the immediately preceding day unless the immediately preceding day is a different category, a day one week prior, and a day two weeks prior, wherein the categories comprise weekday days, weekend days, and holidays.

19. The system of claim 16, wherein the relationship comprises summation of all weighted past observed loads.

20. A computer-readable medium comprising non-transitory computer-readable instructions of a computer program that, when executed by a processor, cause the processor to perform a method of load forecasting for a present day comprising:

obtaining past observed load values of at least three earlier days;

identifying a relationship between the present day's load forecast and the past observed load values including unknown weights associated with the past observed load values;

determining weight values of the unknown weights by comparing at least one previous day's load forecast with the observed load value of the at least one previous day; and using the determined weight values in the relationship between the present day's load forecast and the past observed load values to forecast the present day's load.

* * * * *